(12) United States Patent
Charvat

(10) Patent No.: US 7,162,977 B1
(45) Date of Patent: Jan. 16, 2007

(54) SMALL ANIMAL RESTRAINT CHUTE

(76) Inventor: LeeRoy Charvat, 1133 1st Rd., Wilson, KS (US) 67490

( * ) Notice: Subject to any disclaimer, the term of this patent is extended or adjusted under 35 U.S.C. 154(b) by 0 days.

(21) Appl. No.: 11/070,342

(22) Filed: Mar. 1, 2005

(51) Int. Cl.
  *A01K 15/04* (2006.01)
(52) U.S. Cl. ............... 119/751; 119/752; 119/417; 119/482; 472/71; 472/75
(58) Field of Classification Search ............... 119/751, 119/752, 417, 482, 496, 671, 678; 472/71, 472/75, 81
  See application file for complete search history.

(56) References Cited

U.S. PATENT DOCUMENTS

| | | | |
|---|---|---|---|
| 4,567,854 A | 2/1986 | Burns | |
| 4,942,846 A | 7/1990 | Reinhold | |
| 5,009,196 A | 4/1991 | Young | |
| 5,184,572 A | 2/1993 | Meier | |
| 5,233,939 A * | 8/1993 | Randolph | 119/473 |
| 5,320,069 A | 6/1994 | Anderson | |
| 5,441,016 A * | 8/1995 | Ricketts | 119/723 |
| 5,823,146 A | 10/1998 | Alaniz | |
| 6,408,796 B1 * | 6/2002 | Hampel | 119/498 |
| 6,484,672 B1 * | 11/2002 | Versaw | 119/751 |
| 2004/0134444 A1 * | 7/2004 | Shiever et al. | 119/496 |
| 2004/0168652 A1 | 9/2004 | Priefert | |

* cited by examiner

*Primary Examiner*—Peter M. Poon
*Assistant Examiner*—Willie Berry, Jr.
(74) *Attorney, Agent, or Firm*—Randal D. Homburg

(57) ABSTRACT

A small animal restraining device for the veterinarian treatment of small animals provides an enclosure having an opaque integrated front panel having a plurality of access panels, a rear panel, a floor panel and a cover lid forming a rectangular box defining an interior cavity, a first door panel attached to the rear panel and a second door attached to the rear panel, each door having a head engaging apparatus within a head opening, and a central interior squeeze panel pivotally and adjustably anchored within the interior cavity to the floor panel, the central interior squeeze panel urged towards the front panel to secure a body portion of the small animal between the central interior panel and the front panel while securing a head portion of the small animal within the head opening of either the first door or the second door, the head openings of the first door and second door providing the only light to the interior cavity, except for when one or more of the access panels are open to access the body portion of the restrained small animal.

10 Claims, 4 Drawing Sheets

SMALL ANIMAL RESTRAINT CHUTE

CROSS REFERENCE TO RELATED APPLICATIONS

None

I. BACKGROUND OF THE INVENTION

1. Field of Invention

A small animal restraining device for the veterinarian treatment of small animals provides an enclosure having an opaque integrated front panel having a plurality of access panels, a rear panel, a floor panel and a cover lid forming a rectangular box defining an interior cavity, a first door panel attached to the rear panel and a second door attached to the rear panel, each door having a head engaging means within a head opening, and a central interior squeeze panel pivotally and adjustably anchored within the interior cavity to the floor panel, the central interior squeeze panel urged towards the front panel to secure a body portion of the small animal between the central interior panel and the front panel while securing a head portion of the small animal within the head opening of either the first door or the second door, the head openings of the first door and second door providing the only light to the interior cavity, except for when one or more of the access panels are open to access the body portion of the restrained small animal.

2. Description of Prior Art

The following United States patents were discovered and are disclosed within this application for utility patent. The first three patents disclosed all relate to small animal restraint devices. In U.S. Pat. No. 5,009,196 to Young, a cat restraint is disclosed having a modular frame, much like that of a cot frame over which is attached a sling having opening for placement of the limbs of the cat and a front and rear harness apparatus to retain the cat on the top of the sling. Its primary function is to restrain a cat for bathing or veterinarian care. A similar animal restrain is disclosed in U.S. Pat. No. 5,8236,146 to Alaniz, wherein the frame is on wheels and a restraining litter is applied to the upper frame, the litter having a plurality of spaced holes for again retaining the limbs of the animal placed upon the device. A pig is shown in FIG. 3 as the restrained animal. U.S. Pat. No. 5,320,069 to Anderson discloses a hollow clear tube within which is placed a laboratory rodent, is primarily designed to provide opening to the eyes of the rodent with an end hole through which the animal's nose may take in air, with a rear panel to prevent the animal from backing out of the tube during restraint.

Larger animal restraints were also located. In U.S. Pat. No. 4,567,854 to Burns, a cattle chute is disclosed which may be rotated in a vertical direction, the animal confined within the chute with the chute being rotated for access to the upper and lower extremities of the confined animal. It has a rear and front panel, two side panels which may be drawn towards each other to pinch the animal sides, with the front panel having an opening through which the head of the animal may protrude while retaining the sides of the neck of the animal. A similar chute is disclosed in U.S. Pat. No. 5,184,572 to Meier. U.S. Pat. No. 4,942,846 to Reinhold is a pickup mounted portable head restraint for restraining an animal in the field while medical attention is rendered to an animal. A pending patent, Application No. Us 2004/0168652A1 to Priefert also discloses an animal chute with a rear panel and a front head catch with the side opening out to release the animal after restraint.

None of the above patents, alone or in combination disclose an enclosure having an opaque integrated front panel having a plurality of access panels, a rear panel, a floor panel and a cover lid forming a rectangular box defining an interior cavity, a first door panel attached to the rear panel and a second door attached to the rear panel, each door having a head engaging means within a head opening, and a central interior squeeze panel pivotally and adjustably anchored within the interior cavity to the floor panel, the central interior squeeze panel urged towards the front panel to secure a body portion of the small animal between the central interior panel and the front panel while securing a head portion of the small animal within the head opening of either the first door or the second door, the head openings of the first door and second door providing the only light to the interior cavity.

II. SUMMARY OF THE INVENTION

In the veterinarian profession, doctors may encounter large and small animals. The prior art is ample as to large restraint devices to work on large livestock by providing generally metal enclosures which allow an animal to enter a confined area, with a rear door to prevent regress. A head restraint is provided to retain the neck of the animal while being treated, the head restrain usually provided in a front door opening, which, after release of the animals head from the restrain, allows the animal to back up and leave after the front panel is opened. Side panel section are generally pivotally and vertically mounted to "squeeze" the animal from the side to prevent the animal from being able to move laterally which within the chute. Other side panels may allow limited access to parts of the confined animal, such as a rear panel to access the genitals of a young bull for castration or upper panels to introduce vaccines and medicines to the animal shoulder area. These are adequate for use with horses, cattle and even sheep. However, they do not work well or adapt to use for dogs and cats.

It has been found that small pets, especially cats, do not like to be confined, nor do they enjoy a trip to the veterinarian, especially regarding the restraint of the pet. Often it takes one person to hold an animal and another to treat it, unless the animal is placed under anesthesia. Therefore, it would be useful to provide a complete small animal enclosure with a front and rear door panel leading to an inner cavity defined by a front panel, rear panel a floor and an upper lid forming a complete enclosure, all panels being opaque, with an internal pivotal panel adjustably mounted to the floor to retain the sides of the animal within the inner cavity, the front panel having multiple spaced access panels to gain access to different parts along the length of the confined animal, with the front and rear door panels having retractable head and neck restraints which gently retain the neck of the small animal in a radial restraint area of the neck. Access may also be gained to the top of the animal by opening the upper lid. As the small animal enters the inner cavity, it has a natural tendency to advance towards the opening in the opposing door panel where the only tangible light is found in the enclosure at the time of entry. The animal will place its head in the opening in an attempt to escape the enclosure, at which time the head restraint is applied. When fully restrained, the enclosure retains the animal allowing a single person to render treatment to the animal without being bitten, scratched or otherwise assaulted by the animal.

The primary objective of the invention is to provide an enclosure to retain a small animal or pet during veterinarian treatment. A second objective is to provide the enclosure as an opaque enclosure with only the openings in the front and rear door panels allowing light into the inner cavity of the enclosure when the animal is loaded and unloaded to direct the head of the animal through the openings into the head restraint where the head is retained during treatment or care. A third objective is to provide a front panel with multiple access openings to gain access along the length of the animal, the rear door panel to access the rear of the animal, the upper lid to access the top of the animal, and the pivotally mounted internal pivot panel to squeeze the sides of the animal for full body restraint.

III. DESCRIPTION OF THE DRAWINGS

The following drawings are submitted with this utility patent application.

IV. DESCRIPTION OF THE PREFERRED EMBODIMENT

Figure 1:
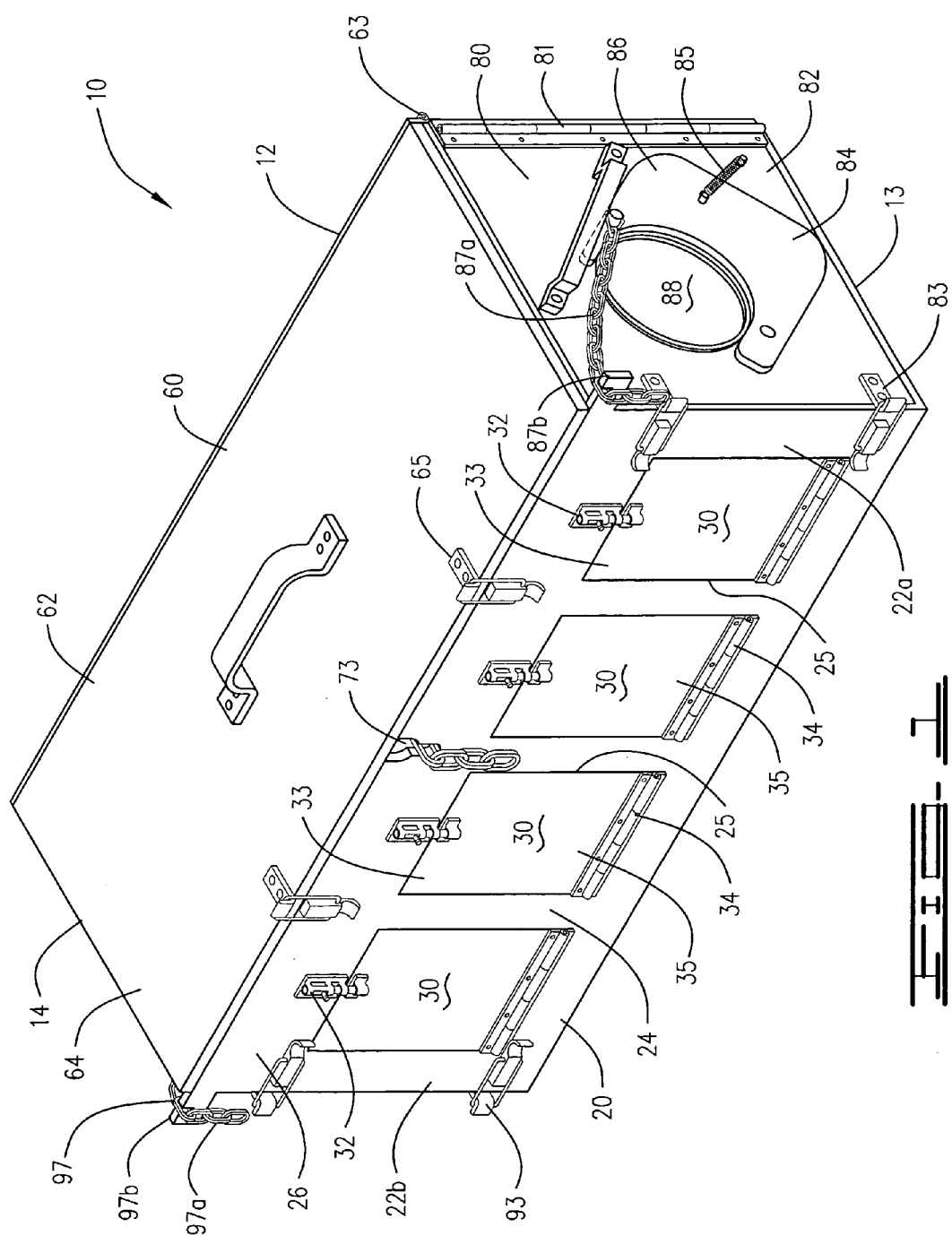
FIG. 1 is an upper perspective view of the restraining chute in a closed position.

A small animal restraining chute 10, shown in FIGS. 1–6 of the drawings, is utilized during veterinarian treatment to contain, immobilize and restrain a small animal without requiring another person or anesthesia, the restraining chute 10 comprising a rectangular opaque enclosure 12 including a solid front panel 20 having a plurality of hinged access panels 30 covering an equal plurality of front access openings 25 with a locking closure means 32, a solid floor panel 40, a solid rear panel 50, and a solid upper lid panel 60 hingeably attached to the rear panel 50, the enclosure 12 defining an inner cavity 15. The enclosure 12 further comprises a first end 13 to which a solid first door panel 80 is attached to the rear panel 50 by a first hinge 81, a second end 14 to which a solid second door panel 90 is attached to the rear panel 50 by a second hinge 91, the first door panel 80 and second door panel 90 each having a door panel closure means 83, 93 and a head opening 88, 98 with an adjustable neck restriction means 86, 96, said inner cavity 15 having a detachable interior squeeze panel 70 with a lower edge 71 adjustably and pivotally mounted to an upper surface 42 of the floor panel 40 of the enclosure 12, said interior squeeze panel 70 further having an upper edge 72 to which is attached an upper squeeze panel locking means 73 allowing the upper edge 72 of the interior squeeze panel 70 to be pivotally drawn towards the front panel 20, applying lateral pressure to a small animal located between the interior squeeze panel 70 and the front panel 20. The small animal is introduced through either the first door panel 80 or second door panel 90 into the inner cavity 15 of the enclosure 12 between the front panel 20 and the interior squeeze panel 70. A head portion of the animal is urged through either the head opening 88, 98 of either the first door panel 80 or second door panel 90 and the neck restriction means 86, 96 is applied around a neck portion of the small animal to hold the head of the small animal stationary. The upper edge 72 of the interior squeeze panel 70 is then drawn towards the front panel 20, applying lateral pressure to the small animal to restrict lateral movement of the small animal rendering the contained small animal immobile for the rendering of veterinarian care and treatment without need of assistance or anesthesia.

It would be most preferred if the entire restraining chute 10 were made of a stainless steel, aluminum or durable plastic material. This would allow for the device to be thoroughly cleansed between uses and prevent staining or difficult removal of animal urine, fecal matter or other animal bodily fluids or material. It would also prevent damage to the restraining chute 10 by claws of the animal, which most likely will not be content during its restraint and treatment, if typical to most small animals. It would also be preferred that the front panel 20, floor panel 40 and rear panel 50 be made as a unitized or singularly molded component, where adjoining edges were formed by a bending or brake process when made of a metal material.

The enclosure 12, being opaque, should restrict the introduction of light into the inner cavity 15 when the upper lid panel 60 and the first door panel 80 and second door panel 90 are closed and secured, FIG. 1, except through the head openings 88, 98. This is provided to cause the small animal introduced into the inner cavity 15 to seek escape from the inner cavity 15 through only the head openings 88, 98, which would promote the head of the animal to be directed through the head opening 88, 98, wherein the head may be held for application of the adjustable neck restriction means 86, 96 to the neck portion of the animal.

Figure 5:
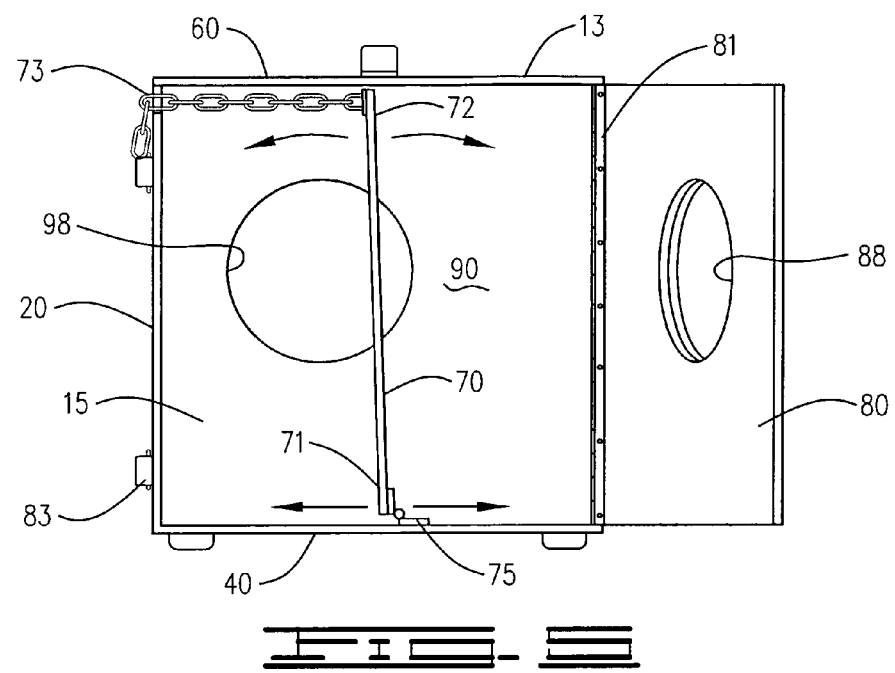
FIG. 5 is a first end view with the first door panel open, exposing the inner cavity.
Figure 6:
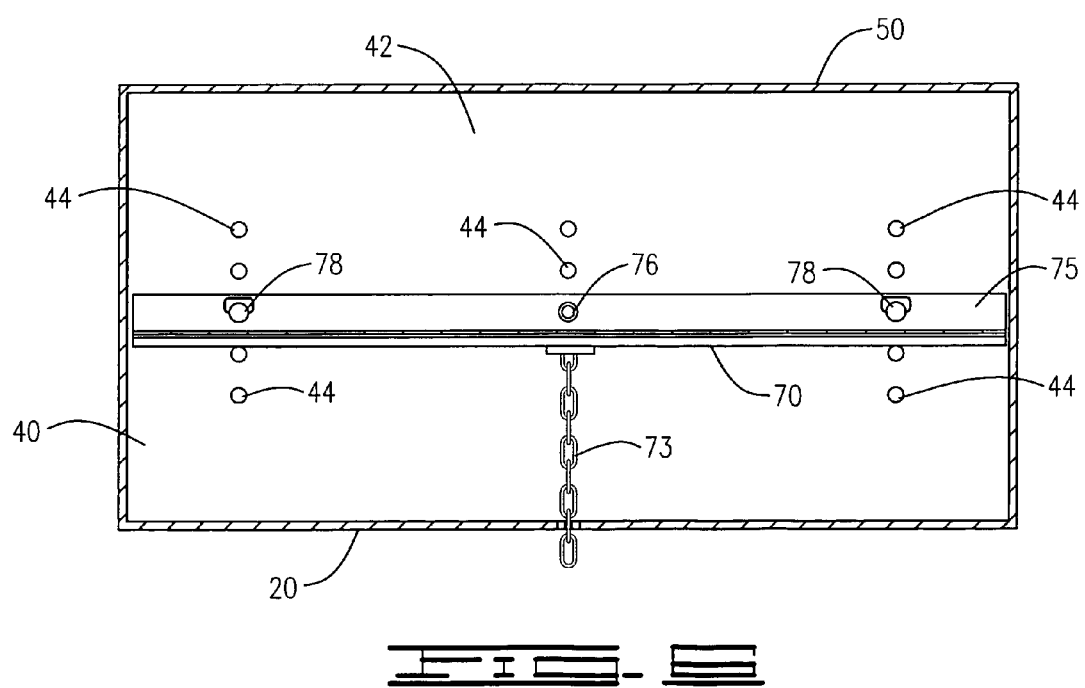
FIG. 6 is an upper view of the floor panel and the squeeze panel.

The interior squeeze panel 70 further comprises the lower edge 71 to which is attached a lower pivotal mounting bracket 75 which allows the interior squeeze panel 70 to pivot between the rear panel 50 and the front panel 20, FIG. 5. Removable pins 78 placed through at least two holes 76 in the pivotal mounting bracket 75 affix the pivotal mounting bracket 75 within a plurality of aligned sets of indentations 44 within the upper surface 42 of the floor panel 40, as indicated in FIG. 6. The removable pins 78 may be placed in any chosen set of indentations 44, and would be adjusted, FIG. 5 to accommodate the width of the small animal to prevent over-exertion of lateral force to the small animal confined between the interior squeeze panel 70 and the front panel 20. When the small animal is securely contained between the interior squeeze panel 70 and the front panel 20, the upper squeeze panel locking means 73 is applied to prevent release of the small animal from lateral confinement during treatment. Upon the conclusion of the treatment, the upper squeeze panel locking means 73 is released to free the animal from the lateral confinement.

Figure 3:
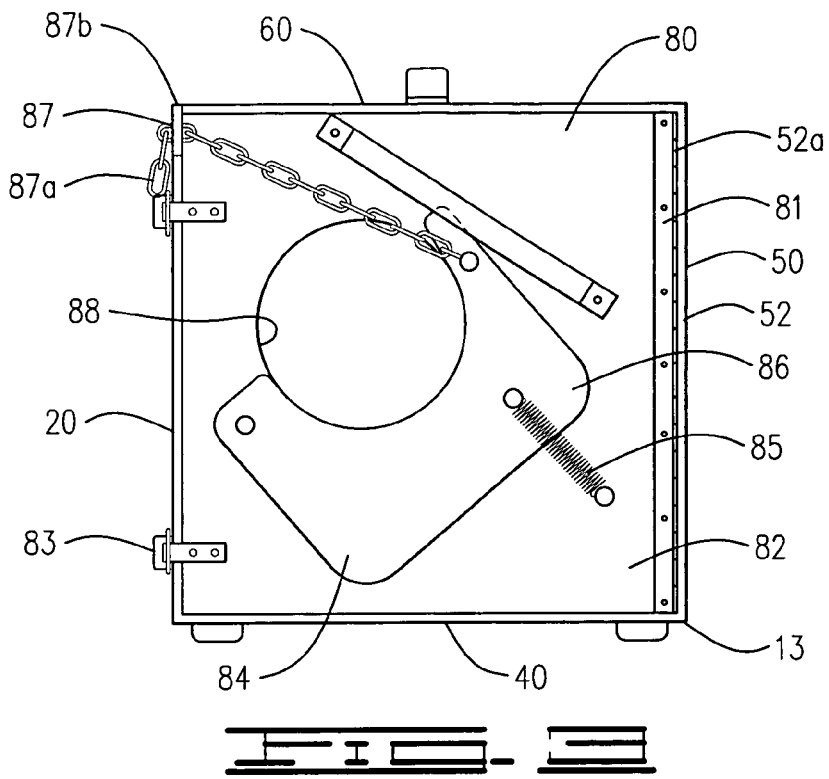
FIG. 3 is a first end view with the adjustable neck restraining means in an open position.
Figure 4:
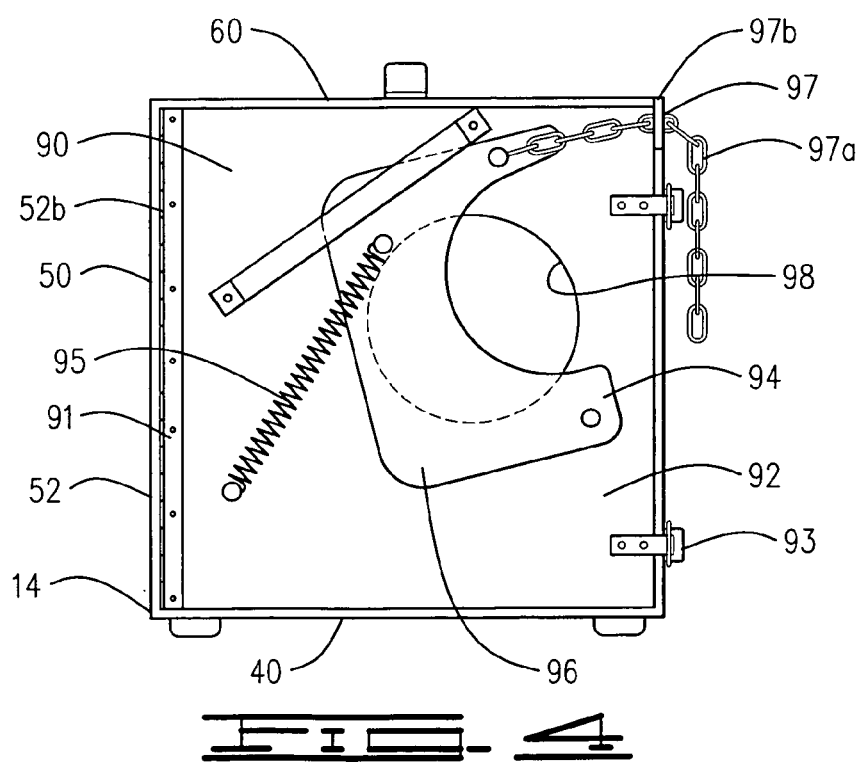
FIG. 4 is a second end view with the adjustable neck restraining means in a closed position.

The first door panel 80 and second door panel 90 are mirror image components, FIGS. 3–4. Both door panels 80, 90 are secured to the rear panel 50 by the respective first and second hinges 81, 91, most preferably a laterally applied long hinge, commonly referred to in the art as a piano hinge, shown in FIG. 5 of the drawings, to distribute force along an entire vertical edge 52*a*, 52*b* of the rear panel 50. The door panel closure means 83, 93 is preferably a locking hasp and pin or other locking device which secures to first door panel 80 and second door panel 90 to a respective lateral edge 22*a*, 22*b* of the front panel 20, which could be activated and deactivated with one hand of a user.

The adjustable neck restriction means 86, 96 further comprise a pivotal arm 84, 94 attached to an outer surface 82, 92 of each respective first door panel 80 and second door panel 90 adjacent to the head openings 88, 98, FIGS. 3–4. A spring 85, 95 anchored to the outer surface 82, 92 of each door panel 80, 90 and the pivotal arm 84, 94 urges the pivotal arm 84, 94 in a direction away from the head opening 88, 98, thus requiring an applied force to pull the pivotal arm 84, 94 across the head opening 88, 98 reducing the head opening 88, 98. A pivotal arm locking means 87, 97, preferably a chain 87a, 97a which may engage a chain retaining catch 87b, 97b attached to the front panel 20, maintains the pivotal arm 84, 94 around the neck of the small animal during treatment, the pivotal arm 84, 94 drawn across the head opening 88, 98 so that the head of the animal may not be withdrawn past the pivotal arm 84, 94 through the head opening 88, 98, but not so far as to restrict the animal from respiratory activity.

Figure 2:
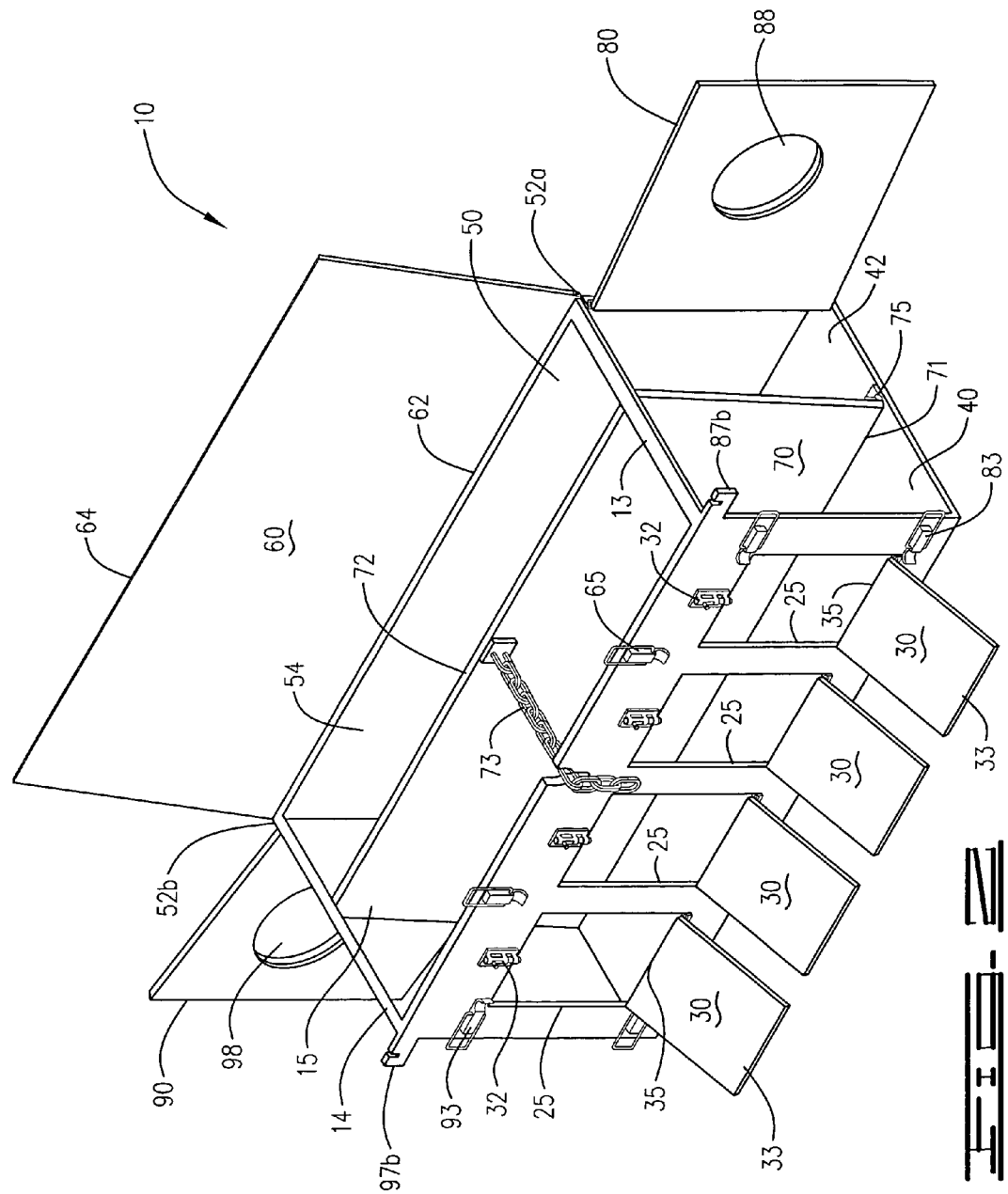
FIG. 2 is an upper perspective view of the restraining chute in an open position exposing the inner cavity.

The front panel 20 further comprises an outer surface 24. Each hinged access panel 30 has an upper edge 33 which is attached to the outer surface 24 of the front panel 20 by a hinge 34, and a lower edge 35 to which is applied the locking closure means 32, which locks the hinged access panel 30 over the mated front access opening 25. In FIGS. 1–2, there are four hinged access panels 30 over four front access openings 25, but any number of access openings 25 and access panels 30 may be provided. These hinged access panels 30 may be opened during treatment to provide access along the length of the small animal for treatment purposes.

Access to the small animal may also be gained by opening the upper lid panel 60, which has a rear edge 62 attached to an upper edge 54 of the rear panel 50 by a hinge 63, again preferably a piano hinge, as shown in FIG. 1 of the drawings. A front edge 64 of the upper lid panel 60 is secured to an upper edge 26 of the front panel 20 by another door panel closure means 65 when the upper lid panel 60 is to remain closed.

It is also contemplated within the scope of this restraining chute, though not shown in the drawing figures, that the entire restraining chute 10 be mounted upon a portable table having a table top extending beyond the restraining chute 10 for placement of a small animal cage within which the small animal is transported, the small animal thus being release directly from the small animal cage into the inner cavity 15 of the restraining chute 10, and later release from the restraining chute 10 into a small animal cage. The plurality of hinged access panels 30 and the access openings 25 may also be replaced by a single access panel and a single access opening in the front panel with a single locking closure means, the single access opening extending across a majority of the width of the front panel. The pivotal arm locking means 97 may also be embodied as a sliding arm member, which is not shown, but is contemplated within the scope of this restraining chute.

While the invention has been particularly shown and described with reference to a preferred embodiment thereof, it will be understood by those skilled in the art that changes in form and detail may be made therein without departing from the spirit and scope of the invention.

What is claimed is:

1. A small animal restraining chute utilized during veterinarian treatment to contain, immobilize and restrain a small animal without requiring assistance of another person or anesthesia, said restraining chute comprising:
    a rectangular and solid opaque enclosure including a solid front panel having a plurality of hinged access panels covering an equal plurality of front access openings with a locking closure means, a solid floor panel, a solid rear panel, and a solid upper lid panel hingeably attached to said rear panel, said enclosure defining an inner cavity;
    a solid first door panel attached to said rear panel at a first end of said enclosure by a first hinge and a solid second door panel attached to said rear panel at a second end of said enclosure by a second hinge, said first door panel and second door panel each having a door panel closure means and a head opening with an adjustable neck restriction means; and
    a detachable interior squeeze panel within said inner cavity, said squeeze panel having a lower edge adjustably and pivotally mounted to an upper surface of said lower panel of said enclosure and an upper edge to which is attached an upper squeeze panel locking means allowing said upper edge of said squeeze panel pivotally drawn towards said front panel, applying lateral pressure to a small animal located between said squeeze panel and said front panel, wherein said restraining chute restricts any light into said inner cavity when said upper lid panel, first door panel and second door panel are closed and secured, except through said head openings.

2. The restraining chute, as disclosed in claim 1, wherein said interior squeeze panel further comprises:
    a lower pivotal mounting bracket attached to said lower edge allowing said squeeze panel to pivot between said rear panel and said front panel; and
    removable pins placed through at least two holes in said pivotal mounting bracket to secure said pivotal mounting bracket within a plurality of aligned sets of indentations within said upper surface of said floor panel, said removable pins placed in a selected set of indentations to prevent over-exertion of lateral force between said squeeze panel and said front panel, said upper squeeze panel locking means applied during treatment to prevent release of said squeeze panel until conclusion of treatment.

3. The restraining chute, as disclosed in claim 1, wherein said first door panel and said second door panel are mirror image components, each door panel further comprising:
    a respective first and second hinge attach a respective lateral edge of each door panel to a vertical edge of said rear panel; and
    each said door panel closure means is a locking hasp and pin which independently secures each door panel to a respective lateral edge of said front panel, and is activated and deactivated without requiring use of two hands.

4. The restraining chute, as disclosed in claim 1, said adjustable neck restriction means further comprising:
    a pivotal arm attached to an outer surface of each respective first door panel and second door panel adjacent to said head opening;
    a spring anchored to said outer surface of each door panel and said pivotal arm urging said pivotal arm in a direction away from said head opening, thus requiring an applied force to pull said pivotal arm across said head opening reducing said head opening; and
    a pivotal arm locking means attached to said front panel, maintaining said position of pivotal arm during treatment, said pivotal arm drawn across said head opening so that the small animal may not withdraw beyond said pivotal arm through said head opening, but not so far as to restrict the small animal respiratory activity.

5. The restraining chute, as disclosed in claim 1, wherein said front panel further comprises an outer surface, each hinged access panel has an upper edge attached to said outer surface of said front panel by a hinge and a lower edge attaching to said locking closure means, locking said hinged access panel over said respective front access opening, and said upper lid panel further comprises a rear edge attached to an upper edge of said rear panel by a hinge, while a front edge of said upper lid panel is secured to an upper edge of said front panel by a door panel closure means to secure said lid panel.

6. The restraining chute, as disclosed in claim 1, further comprising:

said interior squeeze panel including a lower pivotal mounting bracket attached to said lower edge allowing said squeeze panel to pivot between said rear panel and said front panel, and removable pins placed through at least two holes in said pivotal mounting bracket to secure said pivotal mounting bracket within a plurality of aligned sets of indentations within said upper surface of said floor panel, said removable pins placed in a selected set of indentations to prevent over-exertion of lateral force between said squeeze panel and said front panel, said upper squeeze panel locking means applied during treatment to prevent release of said squeeze panel until conclusion of treatment;

said first door panel and said second door panel are mirror image components, and each door panel including a respective first and second hinge attach a respective lateral edge of each door panel to a vertical edge of said rear panel, and each said door panel closure means is a locking hasp and pin which independently secures each door panel to a respective lateral edge of said front panel, and is activated and deactivated without requiring use of two hands;

said adjustable neck restriction means includes a pivotal arm attached to an outer surface of each respective first door panel and second door panel adjacent to said head opening, a spring anchored to said outer surface of each door panel and said pivotal arm urging said pivotal arm in a direction away from said head opening, thus requiring an applied force to pull said pivotal arm across said head opening reducing said head opening, and a pivotal arm locking means attached to said front panel, maintaining said position of pivotal arm during treatment, said pivotal arm drawn across said head opening so that the small animal may not withdraw beyond said pivotal arm through said head opening, but not so far as to restrict the small animal respiratory activity; and said front panel further comprises an outer surface, each hinged access panel has an upper edge attached to said outer surface of said front panel by a hinge, and a lower edge attaching to said locking closure means, locking said hinged access panel over said respective front access opening, and said upper lid panel further comprises a rear edge attached to an upper edge of said rear panel by a hinge, while a front edge of said upper lid panel is secured to an upper edge of said front panel by a door panel closure means to secure said lid panel.

7. A small animal restraining chute utilized during veterinarian treatment to contain, immobilize and restrain a small animal without requiring assistance of another person or anesthesia, said restraining chute comprising:

a rectangular and solid opaque enclosure including a solid front panel having a plurality of hinged access panels covering an equal plurality of front access openings with a locking closure means, a solid floor panel, a solid rear panel, and a solid upper lid panel hingeably attached to said rear panel, said enclosure defining an inner cavity;

a solid first door panel attached to said rear panel at a first end of said enclosure by a first hinge and a solid second door panel attached to said rear panel at a second end of said enclosure by a second hinge, said first door panel and second door panel each having a door panel closure means and a head opening with an adjustable neck restriction means further comprising; and a detachable interior squeeze panel within said inner cavity, said squeeze panel having a lower edge attached to a lower pivotal mounting bracket having at least two holes through which at least two removable pins are placed to secure said pivotal mounting bracket within a plurality of aligned sets of indentations within an upper surface of said floor panel of said enclosure while allowing said squeeze panel to pivot between said front panel and said rear panel, said squeeze panel further including an upper edge to which is attached an upper squeeze panel locking means allowing said upper edge of said squeeze panel pivotally drawn towards said front panel, applying lateral pressure to a small animal located between said squeeze panel and said front panel, wherein said restraining chute restricts the introduction of light into said inner cavity when said upper lid panel, first door panel and second door panel are closed and secured, except through said head openings.

8. The restraining chute, as disclosed in claim 7, wherein said first door panel and said second door panel are mirror image components, each door panel further comprising:

a respective first and second hinge attach a respective lateral edge of each door panel to a vertical edge of said rear panel; and each said door panel closure means is a locking hasp and pin which independently secures each door panel to a respective lateral edge of said front panel, and is activated and deactivated without requiring use of two hands.

9. The restraining chute, as disclosed in claim 7, said adjustable neck restriction means further comprising:

a pivotal arm attached to an outer surface of each respective first door panel and second door panel adjacent to said head opening;

a spring anchored to said outer surface of each door panel and said pivotal arm urging said pivotal arm in a direction away from said head opening, thus requiring an applied force to pull said pivotal arm across said head opening reducing said head opening; and a pivotal arm locking means attached to said front panel, maintaining said position of pivotal arm during treatment, said pivotal arm drawn across said head opening so that the small animal may not withdraw beyond said pivotal arm through said head opening, but not so far as to restrict the small animal respiratory activity.

10. The restraining chute, as disclosed in claim 7, wherein said front panel further comprises an outer surface, each hinged access panel has an upper edge attached to said outer surface of said front panel by a hinge, and a lower edge attaching to said locking closure means, locking said hinged access panel over said respective front access opening, and said upper lid panel further comprises a rear edge attached to an upper edge of said rear panel by a hinge, while a front edge of said upper lid panel is secured to an upper edge of said front panel by a door panel closure means to secure said lid panel.

* * * * *